United States Patent
Arra et al.

(10) Patent No.: US 10,334,055 B2
(45) Date of Patent: Jun. 25, 2019

(54) COMMUNICATION LAYER WITH DYNAMIC MULTI-SESSION MANAGEMENT

(71) Applicant: International Business Machines Corporation, Armonk, NY (US)

(72) Inventors: Venkat R. Arra, Bengaluru (IN); Paul M. Cadarette, Hemet, CA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/421,464

(22) Filed: Feb. 1, 2017

(65) Prior Publication Data

US 2018/0219953 A1    Aug. 2, 2018

(51) Int. Cl.

| | |
|---|---|
| *G06F 15/173* | (2006.01) |
| *H04L 29/08* | (2006.01) |
| *H04L 12/26* | (2006.01) |
| *H04L 29/06* | (2006.01) |

(52) U.S. Cl.
CPC ........ *H04L 67/142* (2013.01); *H04L 43/0882* (2013.01); *H04L 69/14* (2013.01); *H04L 43/14* (2013.01); *H04L 67/143* (2013.01)

(58) Field of Classification Search
CPC ... H04L 43/0882; H04L 43/14; H04L 67/142; H04L 67/143; H04L 69/14
See application file for complete search history.

(56) References Cited

U.S. PATENT DOCUMENTS

| | | | |
|---|---|---|---|
| 6,754,228 B1 * | 6/2004 | Ludwig | H04L 47/10 370/231 |
| 7,164,661 B2 * | 1/2007 | Kelly | H04B 7/18578 370/323 |
| 7,680,038 B1 * | 3/2010 | Gourlay | H04L 41/0896 370/230 |
| 8,379,535 B2 | 2/2013 | Chen et al. | |
| 8,756,310 B2 * | 6/2014 | Agarwala | H04L 43/0882 709/224 |
| 8,806,030 B2 | 8/2014 | Zhu et al. | |

(Continued)

FOREIGN PATENT DOCUMENTS

WO    2015150812 A1    10/2015

*Primary Examiner* — Mohamed A. Wasel
(74) *Attorney, Agent, or Firm* — North Shore Patents, P.C.; Michele Liu Baillie

(57) ABSTRACT

In dynamic multi-session management, a communication layer monitors network indicators during sending of application messages over a session established between sender and receiver nodes. Based on the network indicators, the communication layer determines that the session has insufficient bandwidth. In response, at least one session is added between sender and receiver nodes, where a plurality of parallel sessions is established between sender and receiver nodes. The application messages are sent over the plurality of sessions. The communication layer continues to monitor the network indicators, and when the plurality of sessions is determined to have insufficient bandwidth, adds at least one more session between sender and receiver nodes. The communication layer further determines, based on the network indicators, whether the plurality of sessions have excess bandwidth If so, one or more sessions are removed. The communication layer may further provide ordering mechanisms to sequence messages sent over the plurality of sessions.

14 Claims, 4 Drawing Sheets

(56) References Cited

U.S. PATENT DOCUMENTS

| | | | | |
|---|---|---|---|---|
| 9,197,702 | B2* | 11/2015 | Narayanan | H04L 67/06 |
| 9,825,815 | B2* | 11/2017 | Bandyopadhyay | H04L 41/0896 |
| 2004/0213257 | A1* | 10/2004 | Abdelilah | H04L 29/06027 370/395.1 |
| 2006/0045095 | A1* | 3/2006 | Dhar | H04L 47/15 370/395.42 |
| 2012/0054362 | A1 | 3/2012 | Tsao et al. | |
| 2013/0170357 | A1* | 7/2013 | Anchan | H04L 65/4076 370/237 |
| 2017/0302742 | A1* | 10/2017 | Zhou | H04L 29/08 |
| 2017/0366467 | A1* | 12/2017 | Martin | H04L 43/08 |

\* cited by examiner

COMMUNICATION LAYER WITH DYNAMIC MULTI-SESSION MANAGEMENT

BACKGROUND

Many distributed applications today rely on session-oriented communication methods, such as TCP/IP, as their primary method of inter-node communication. A typical scenario involves the use of a single socket session between nodes, with this single session providing sufficient bandwidth. There is a class of applications where the bandwidth of a single session can be exhausted as the source node scales up and overdrives either the network capacity, or the target node's ability to offload from the network. Network tuning techniques, such as the configuration of proper TCP/IP send and receive buffer sizes, can help to optimize the single session or single consumer thread approach. A multi-session approach can increase network bandwidth and end-to-end throughput up until the point that the single threaded target nodes capability to offload the network is not exceeded.

However, many distributed applications are architected for a single session approach. In order for the application to adopt a multi-session approach, the architectural design of the application must be modified, which amounts to a rewriting of the application. The rewriting of the application is a non-trivial task that requires significant resources.

SUMMARY

Disclosed herein is a method for dynamic multi-session management by a communications layer and a computer program product as specified in the independent claims. Embodiments of the present invention are given in the dependent claims. Embodiments of the present invention can be freely combined with each other if they are not mutually exclusive.

According to an embodiment of the present invention, in a method for dynamic multi-session management, a communication layer: monitors network indicators during a sending of messages of an application over a session established between a sender node and a receiver node; determines, based on the network indicators, that the session is blocked or has insufficient bandwidth for sending the messages; in response, adds at least one session between the sender node and the receiver node, wherein a plurality of parallel sessions are established between the sender node and the receiver node; sends the messages of the application between the sender node and the receiver node over the plurality of sessions; continues to monitor the network indicators during the sending of the messages over the plurality of sessions; determines, based on the network indicators, whether the plurality of sessions is idle or have sufficient bandwidth for the sending of the messages; and when the plurality of sessions is determined to have insufficient bandwidth for the sending of the messages, adds at least one more session between the sender node and the receiver node.

In one aspect of the present invention, the communication layer further: determines, based on the network indicators, whether the plurality of sessions have excess bandwidth for the sending of the messages; and when the plurality of sessions is determined to have excess bandwidth for the sending of the messages, removing one or more of the plurality of sessions.

In one aspect of the present invention, the communication layer further provides optional ordering mechanisms to sequence messages sent over the plurality of sessions.

DETAILED DESCRIPTION

Figure 1:
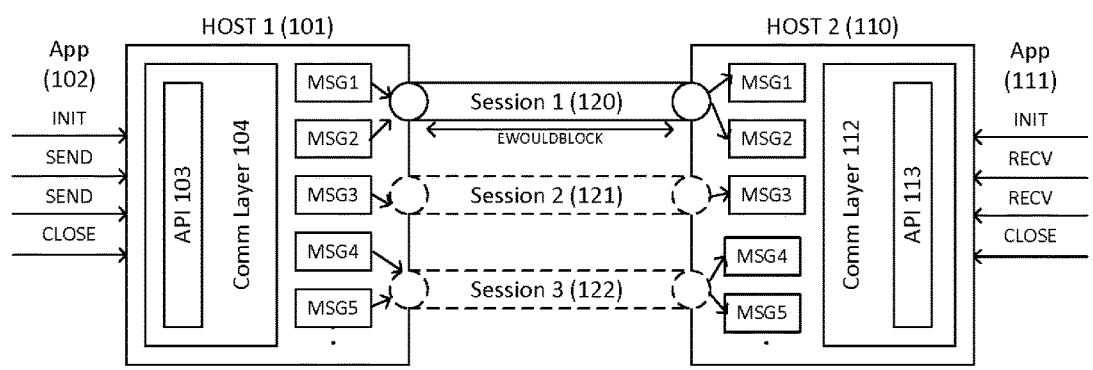
FIG. 1 illustrates an exemplary embodiment of a system with a communication layer that provides dynamic multi-session management.

FIG. 1 illustrates an exemplary embodiment of a system with a communication layer that provides dynamic multi-session management. The system comprises a sender node (Host 1) (101) comprising a communication layer 104 and a receiver node (Host 2) (110) comprising another communication layer 112. The communication layer 104, 112 encapsulates a dynamic multi-session functionality to scale up and down the number of sessions or threads between two nodes. The communication layer 104, 112 further provides flexible message ordering and grouping under the context of a single, application-level, logical session, that is usable by both a single-session sender node and receiver node and their multi-threaded variants. The sender node (Host 1) (101) sends messages (MSG1-MSG5 . . . ) from application 102 to the receiver node (Host 2) (110), who forwards the messages to the application 111. The messages are sent over one or more sessions (Sessions 1-3) (120-122), which are dynamically added and removed according to network conditions. The communication layer 104, 112 allows for an application designed for a single session to "plug-in" to the communication layer 104, 112 via an application programming interface (API) 103, 112, and encapsulates the complexities of multi-session management, including message ordering and network analysis, needed to adjust the configuration based on the current network conditions. Through the API 103, 112, an application 102, 111 may set primitives to enable the multi-session management function and to set primitives used in the multi-session management by the communication layer 104, 112. As illustrated in FIG. 1, the communication layer 104, 112, with the API 103, 113, may be implemented at a sender node 101 and at a receiver node 110.

Figure 2:
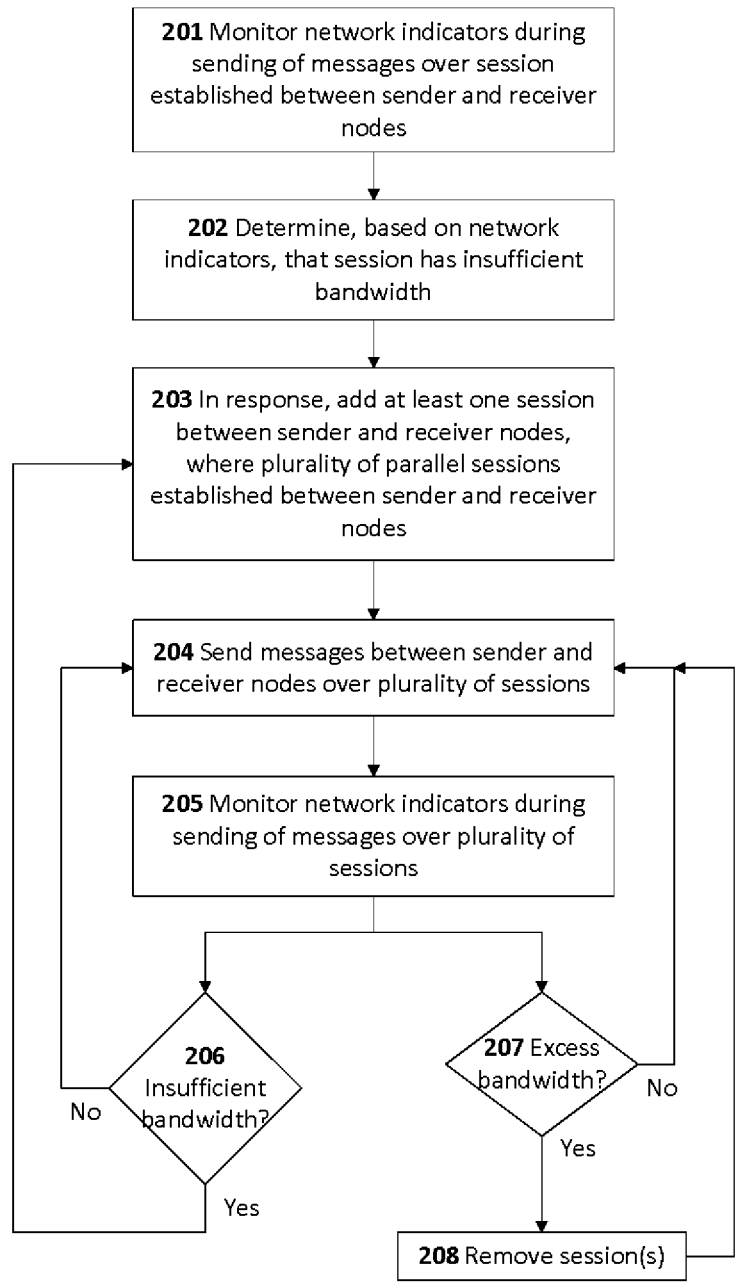
FIG. 2 illustrates an exemplary embodiment of a method for dynamic multi-session management by a communication layer according to the present invention.

FIG. 2 illustrates an exemplary embodiment of a method for dynamic multi-session management by a communication layer according to the present invention. Referring to both FIGS. 1 and 2, the communication layer 104 at the sender node 101 monitors network indicators during the sending of messages (MSG1-MSG5 . . . ) over the session 120 established between the sender node 101 and the receiver node 110 (201). Assume that the communication layer 104 determines, based on the network indicators, that the session 120 is blocked or has insufficient bandwidth (202). In response, the communication layer 104 adds at least one session 121 (Session 2) between the sender node 101 and the receiver node 110, where a plurality of parallel sessions is established between the sender 101 and receiver 110 nodes (203). The plurality of parallel sessions function under a single logical session between the sender node 101 and the receiver node 110. Messages are then sent between the sender node 101 and the receiver node 110 over the plurality of sessions (120-121) (204). The communication layer 104 continues to monitor the network indicators during the sending of messages over the plurality of sessions (120-121) (205). If the network indicators indicate that the plurality of sessions (120-121) is blocked or has insufficient bandwidth (206), then the communication layer 104 adds at least another session 122 (Session 3) between the sender node 101 and the receiver node 110 (203). If the network indicators indicate that the plurality of sessions (120-122) is idle or has excess bandwidth (207), then the communication layer 104 removes one or more sessions from the plurality of sessions (120-122) (208).

In one exemplary embodiment, the network indicators monitored include EGAIN or EWOULDBLOCK, both of which indicates that an I/O block has occurred. However, other network indicators for measuring the throughput may be used instead of or in addition to EGAIN or EWOULDBLOCK. In this exemplary embodiment, the logical session between the sender node 101 and the receiver node 110 starts with a single session 120, and messages are sent over this session 120 until EGAIN or EWOULDBLOCK is received by the communication layer 104 (201). The last message may then be retried one or more times. If EGAIN or EWOULDBLOCK continues to be received (202), then the communication layer 104 adds another session 121 between the sender node 101 and the receiver node 110 (203). Sessions 120 and 121 function in parallel under the same logical session. The current and succeeding messages are pushed onto the new session 121 (204). The communication layer 104 continues to monitor each session 120-121 for EGAIN or EWOULDBLOCK (205), and either adds more sessions 122 if all existing sessions are blocked (206, 203) or distributes the messages to an idle session of the plurality of sessions (204).

To avoid the inefficient use of resources, sessions are removed when no longer required, i.e., when the network indicators show an excess of bandwidth (207-208). For example, when an incoming load is not high, and the original session 120 has sufficient bandwidth to manage the current load, then the new session(s) 121-122 may be removed, for example in reverse order with the newest session removed first. Further, thrashing should be prevented, which may occur when sessions are added and removed too frequently. To prevent thrashing, a minimum threshold and/or a maximum threshold may be set. The maximum threshold sets the level of network indicators that must be exceeded before sessions are added. The minimum threshold sets the level of network indicators that must fall below before sessions are removed. For example, in the exemplary embodiment where EGAIN or EWOULDBLOCK are used as network indicators, a maximum threshold of 100 may be set, where at least 100 EGAIN's or EWOULDBLOCK's must be received within a certain period of time before another session is added. Similarly, a minimum threshold of 20 may be set, where the number of EGAIN's or EWOULDBLOCK's received within a certain period of time must drop below 20 before a session is removed. The minimum and maximum thresholds may be set by the application 102 via primitives in the API 102 and/or set according to a service level agreement (SLA) of the application 102.

With a single session 120, messages are sent and received in order. However, when multiple sessions 120-122 are used, messages may be sent and/or received out of order. Thus, exemplary embodiments of the communication layer 104 of the present invention further provides optional ordering mechanisms to sequence messages sent over the plurality of sessions 120-122. The messages may further be combined into groups based on indicators such as a session bandwidth limit. Message ordering is important when an application 102 wants to maintain data integrity so that messages received are re-ordered in the same order as they are sent. Additionally, message ordering effectively uses network bandwidth to improve application throughput. In an exemplary embodiment of the present invention, message ordering options include implicit ordering, explicit ordering, and explicit ordering and dependency analysis, as discussed further below.

Figure 3:
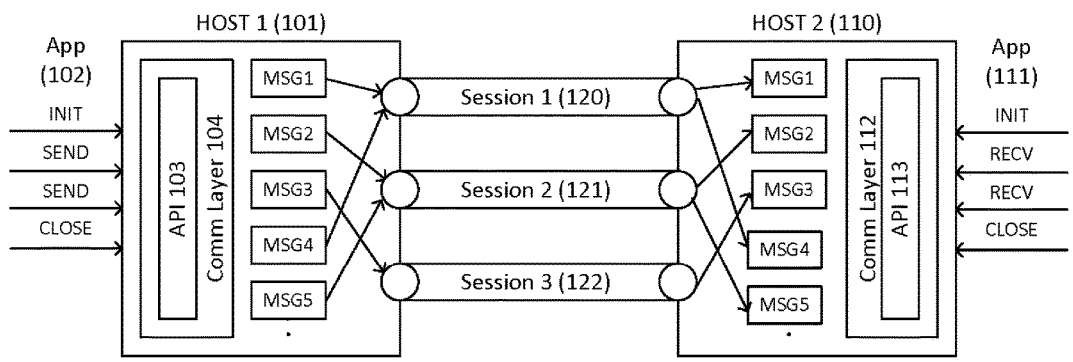
FIG. 3 illustrates an exemplary embodiment of the implicit ordering of messages during dynamic multi-session management by a communication layer according to the present invention.

FIG. 3 illustrates an exemplary embodiment of the implicit ordering of messages during dynamic multi-session management by a communication layer according to the present invention. With implicit ordering, a stream of ordered messages are sent across the sessions 120-122, according to a pre-set pattern of distribution. The sender node 101 creates each message and distributes the messages to the sessions 120-122 according to the pre-set pattern. For example, as illustrated in FIG. 3, the messages (MSG1-MSG5) are distributed to the sessions 120-122 via a pre-set round-robin pattern by the communication layer 104 with MSG1 sent over Session 1 (120), MSG2 sent over Session 2 (121), MSG3 sent over Session 3 (122), etc. The communication layer 112 of the receiver node 110, knowing that the round-robin pattern of distribution is being used, receives the messages (MSG1-MSG5) in the same round-robin pattern. With implicit ordering, the API 103 does not include any ordering primitives.

Figure 4:
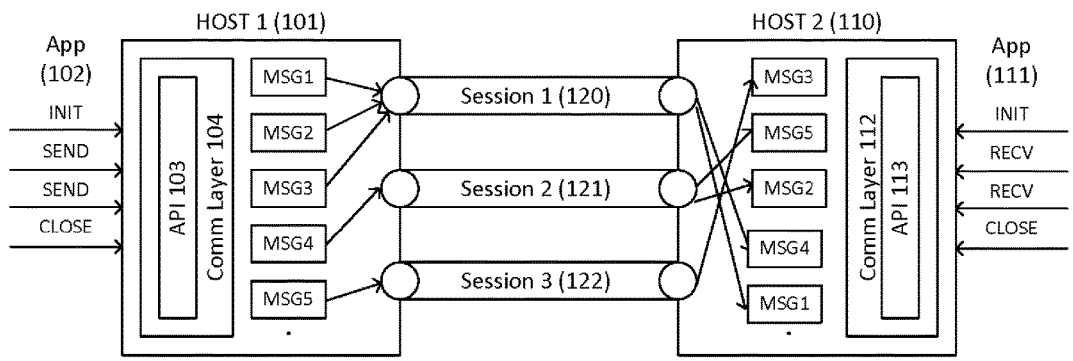
FIG. 4 illustrates an exemplary embodiment of the explicit ordering of messages according to the present invention.

FIG. 4 illustrates an exemplary embodiment of the explicit ordering of messages according to the present invention. With explicit ordering, a grouping pattern is specified in the API 103 by the application 102, including ordering primitives. The communication layer 104 distributes the messages (MSG1-MSG5) according to this grouping pattern. Since the ordering primitives are known, the sender node 101 and the receiver node 110 can work independently. With explicit ordering, the application 102 sends messages (MSG1-MSG5) to the communication layer 104 with a specific order of messages that must be followed. The order may be specified using ordinal numbers inserted into the message by the communication layer 104. The order may be messages in the same or distinct or group or an order within a group, and may include independent messages without an order. The messages are then sent to the receiver node 110 over the sessions 120-122 based on the current capacity of each session 120-122. The receiver node 110 receives the messages (MSG1-MSG5) from each session 120-122 and parses the messages to re-order them based on the ordinal numbers. A specific bandwidth threshold limit may be set for each session 120-122, and messages with different ordinal numbers are added to a session until the threshold is reached. If a session that is loaded with group messages receives EWOULDBLOCK, all of the messages of this session are redistributed to the next available session or a new session when one is added. As illustrated in FIG. 4, the messages (MSG1-MSG5) are ordered explicitly by the sender node 101 on the sessions 120-122, with an order of MSG3-MSG5-MSG2-MSG4-MSG1, and ordinal numbers are inserted in the messages to reflect this order. The sending of the messages in this case is based on the session thresholds, i.e., messages are added to the sessions until a block condition EWOULDBLOCK) is met and the next messages are distributed on other sessions. Session 1 (120) has a high threshold limit and gets the first three messages (MSG1-MSG3). The next two messages, MSG4 and MSG5, are handled by Session 2 (121) and Session 3 (122) depending on their thresholds. The receiver node 110 receives the messages (MSG1-MSG5) on any session. The receiver node 110 then re-order the messages using the ordinal numbers inserted into the messages.

Figure 5:
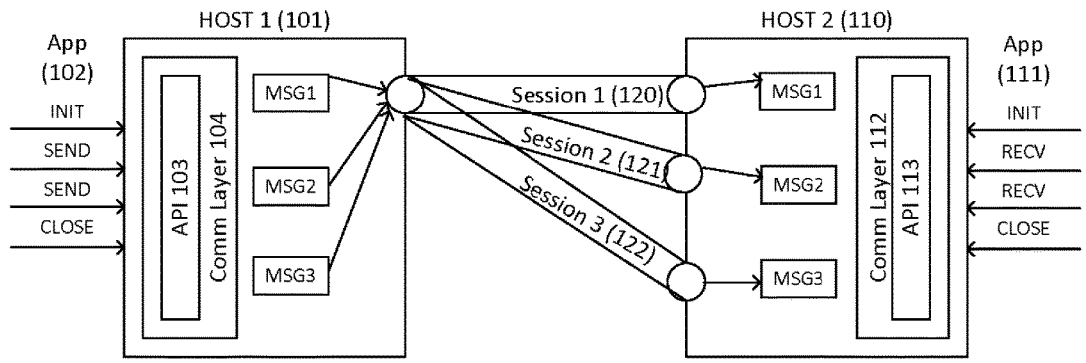
FIG. 5 illustrates an exemplary embodiment of the explicit ordering of messages and dependency analysis during dynamic multi-session management by a communication layer, according to the present invention.

FIG. 5 illustrates an exemplary embodiment of the explicit ordering of messages and dependency analysis during dynamic multi-session management by a communication layer, according to the present invention. Unlike with explicit ordering described above, the message ordering pattern is dynamic and is based on primitives already existing in the messages. The identity of the message primitives to be used for determining the grouping is specific in the API 103, 112. The messages (MSG1-MSG5) are independent of each other while sending. The receiver node 110 analyzes the messages received to determine any dependencies between the messages for the purposes of ordering the messages, and provides the messages in this order to the application 111. The sender node 101, via the API 103, may indicate to the communications layer 104 what number or ID shall be used for each outgoing message being sent to the receiver node 110. The number or ID can be used by the receiver node 104 to re-order the messages received, as expected by the application. Example numbers include a database table ID, a transaction ID, or any other type of ID. Additionally, the communications layer 104 may maintain historical data of block and throughput conditions of each session to effectively use the sessions. The sender node 101 distributes the messages (MSG1-MSG5) on the sessions 120-122 in a dynamic pattern that is sensitive to asynchronous block conditions and to the historic throughput characteristics of a given session. The receiver node 110 receives messages on all sessions 120-122, executes dependency analysis on the received group ordinal numbers and identifies independent segments. The independent segments can include stateless, unordered messages or a completed group of ordered messages. It is also possible to perform dependency analysis at the sender node 101 and use only send independent segments using different unblocked sessions. Here, the sender node 101 performs the dependency analysis to determine which new message is independent of existing messages and whether the new message can be distributed on any available session. For example, if a new message need not be part of any group of messages, then the new message is independent and can be sent separately. As illustrated in FIG. 5, messages (MSG1-MSG5) sent from the sender node 101 are received by different sessions 120-122. The receiver node 110 performs dependency analysis on the messages (MSG1-MSG5) to determine the correct order, i.e., which message needs to be delivered first, second, third, etc. The re-ordering of the messages with dependency analysis is dictated by the ordering requirements as indicated by the application 102 and block conditions.

Although the exemplary embodiments are described with above ordering mechanism, other types of ordering mechanisms may be used during the dynamic multi-session management by the communication layer 104, 112 without departing from the spirit and scope of the present invention.

Figure 6:
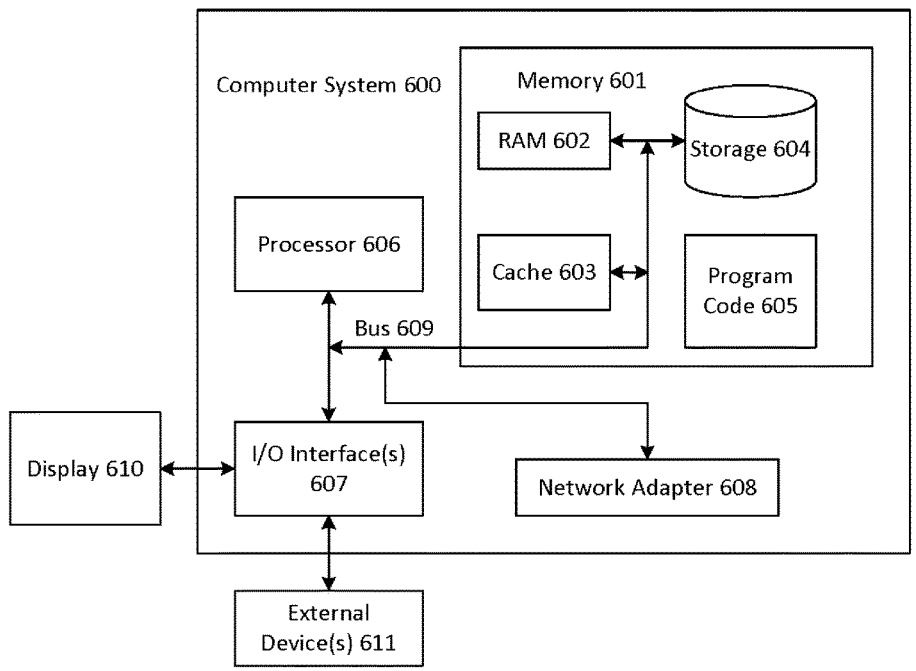
FIG. 6 illustrates a computer system for implementing embodiments of the present invention.

FIG. 6 illustrates a computer system for implementing embodiments of the present invention. The computer system may be implemented as the sender node 101 and/or the receiver node 110. The computer system 600 is operationally coupled to a processor or processing units 606, a memory 601, and a 6us 109 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 102 or cache memory 603, or non-volatile storage media 604. The memory 601 may include at least one program product having a set of at least one program code module 605 that are configured to carry out the functions of embodiment of the present invention when executed by the processor 606. The computer system 600 may also communicate with one or more external devices 611, such as a display 610, via 110 interfaces 107. The computer system 600 may communicate with one or more networks via network adapter 608.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic multi-session management by a communication layer, comprising:
    monitoring network throughput indicators during a sending of messages of an application over a session established between a sender node and a receiver node;
    determining, based on the network throughput indicators exceeding a maximum threshold, that the session has insufficient bandwidth for sending the messages;
    in response, adding at least one session between the sender node and the receiver node, wherein a plurality of parallel sessions are established between the sender node and the receiver node;
    sending the messages of the application between the sender node and the receiver node over the plurality of sessions;
    continuing to monitor the network throughput indicators during the sending of the messages over the plurality of sessions;
    determining, based on the network throughput indicators, whether the plurality of sessions have sufficient or excess bandwidth for the sending of the messages;
    when the network throughput indicators exceed the maximum threshold, determining that the plurality of sessions have insufficient bandwidth for the sending of the messages, and adding at least one more session between the sender node and the receiver node; and
    when the network throughput indicators fall below a minimum threshold, determining that the plurality of sessions have excess bandwidth for the sending of the messages, and removing one or more of the plurality of sessions.

2. The method of claim 1, wherein the sending of the messages of the application between the sender node and the receiver node over the plurality of sessions comprises:
    sending the messages over the plurality of sessions using a pre-set distribution pattern.

3. The method of claim 1, wherein the sending of the messages of the application between the sender node and the receiver node over the plurality of sessions comprises:
    inserting into each of the messages an ordering primitive specified in an application programming interface (API) between the application and the sender node;
    sending the messages comprising the ordering primitives over the plurality of sessions, wherein the receiving node:
        receives the messages comprising the ordering primitives from the plurality of sessions, and
        orders the messages according to the ordering primitives comprised in each message.

4. The method of claim 1, wherein the sending of the messages of the application between the sender node and the receiver node over the plurality of sessions comprises:
    sending the messages over the plurality of sessions, wherein the receiving node:
        receives the messages from the plurality of sessions,
        performs dependency analysis on the messages using primitives comprised in the messages, the primitives to be used for the dependency analysis being specified in an application programming interface (API) between an application at the receiver node and the receiver node; and
        orders the messages according to dependencies identified by the dependency analysis.

5. The method of claim 1, wherein the application is designed to send messages over a single session.

6. A computer program product comprising a computer readable storage medium having program instructions embodied therewith, the program instructions executable by a processor to cause the processor to:
    monitor network throughput indicators during a sending of messages of an application over a session established between a sender node and a receiver node;
    determine, based on the network throughput indicators exceeding a maximum threshold, that the session has insufficient bandwidth for sending the messages;
    in response, add at least one session between the sender node and the receiver node, wherein a plurality of parallel sessions are established between the sender node and the receiver node;
    send the messages of the application between the sender node and the receiver node over the plurality of sessions;
    continue to monitor the network indicators during the sending of the messages over the plurality of sessions;
    determine, based on the network throughput indicators, whether the plurality of sessions have sufficient or excess bandwidth for the sending of the messages;
    when the network throughput indicators exceed the maximum threshold, determine that the plurality of sessions have insufficient bandwidth for the sending of the messages, and add at least one more session between the sender node and the receiver node; and
    when the network throughput indicators fall below a minimum threshold, determine that the plurality of sessions have excess bandwidth for the sending of the messages, and remove one or more of the plurality of sessions.

7. The computer program product of claim 6, wherein the sending of the messages of the application between the sender node and the receiver node over the plurality of sessions comprises:
    send the messages over the plurality of sessions using a pre-set distribution pattern.

8. The computer program product of claim 6, wherein the sending of the messages of the application between the sender node and the receiver node over the plurality of sessions comprises:
    insert into each of the messages an ordering primitive specified in an application programming interface (API) between the application and the sender node;
    send the messages comprising the ordering primitives over the plurality of sessions, wherein the receiving node:
        receives the messages comprising the ordering primitives from the plurality of sessions, and
        orders the messages according to the ordering primitives comprised in each message.

9. The computer program product of claim 6, wherein the sending of the messages of the application between the sender node and the receiver node over the plurality of sessions comprises:
    send the messages over the plurality of sessions, wherein the receiving node:
        receives the messages from the plurality of sessions,
        performs dependency analysis on the messages using primitives comprised in the messages, the primitives to be used for the dependency analysis being specified in an application programming interface (API) between an application at the receiver node and the receiver node; and
        orders the messages according to dependencies identified by the dependency analysis.

10. The computer program product of claim 6, wherein the application is designed to send messages over a single session.

11. A system, comprising:
    a processor; and
    a computer readable storage medium having program instructions embodied therewith, the program instructions executable by a processor to cause the processor to:
    monitor network throughput indicators during a sending of messages of an application over a session established between a sender node and a receiver node;
    determine, based on the network throughput indicators exceeding a maximum threshold, that the session has insufficient bandwidth for sending the messages;
    in response, add at least one session between the sender node and the receiver node, wherein a plurality of parallel sessions are established between the sender node and the receiver node;
    send the messages of the application between the sender node and the receiver node over the plurality of sessions;
    continue to monitor the network indicators during the sending of the messages over the plurality of sessions;
    determine, based on the network throughput indicators, whether the plurality of sessions have sufficient or excess bandwidth for the sending of the messages;
    when the network throughput indicators exceed the maximum threshold, determine that the plurality of sessions has insufficient bandwidth for the sending of the messages, and add at least one more session between the sender node and the receiver node; and
    when the network throughput indicators fall below a minimum threshold, determine that the plurality of sessions have excess bandwidth for the sending of the messages, and remove one or more of the plurality of sessions.

12. The system of claim 11, wherein the sending of the messages of the application between the sender node and the receiver node over the plurality of sessions comprises:
send the messages over the plurality of sessions using a pre-set distribution pattern.

13. The system of claim 11, wherein the sending of the messages of the application between the sender node and the receiver node over the plurality of sessions comprises:
insert into each of the messages an ordering primitive specified in an application programming interface (API) between the application and the sender node;
send the messages comprising the ordering primitives over the plurality of sessions, wherein the receiving node:
receives the messages comprising the ordering primitives from the plurality of sessions, and
orders the messages according to the ordering primitives comprised in each message.

14. The system of claim 11, wherein the sending of the messages of the application between the sender node and the receiver node over the plurality of sessions comprises:
send the messages over the plurality of sessions, wherein the receiving node:
receives the messages from the plurality of sessions,
performs dependency analysis on the messages using primitives comprised in the messages, the primitives to be used for the dependency analysis being specified in an application programming interface (API) between an application at the receiver node and the receiver node; and
orders the messages according to dependencies identified by the dependency analysis.

* * * * *